United States Patent
Mair

(10) Patent No.: US 8,322,959 B2
(45) Date of Patent: Dec. 4, 2012

(54) SELF-BORING SCREW

(75) Inventor: Roland Mair, Gotzis (AT)

(73) Assignee: SFS intec Holding AG, Heerbrugg (CH)

( * ) Notice: Subject to any disclaimer, the term of this patent is extended or adjusted under 35 U.S.C. 154(b) by 286 days.

(21) Appl. No.: 12/740,177

(22) PCT Filed: Feb. 20, 2009

(86) PCT No.: PCT/EP2009/052025
§ 371 (c)(1),
(2), (4) Date: Apr. 28, 2010

(87) PCT Pub. No.: WO2009/106483
PCT Pub. Date: Sep. 3, 2009

(65) Prior Publication Data
US 2010/0266365 A1    Oct. 21, 2010

(30) Foreign Application Priority Data

Feb. 29, 2008  (DE) .......................... 10 2008 011 933

(51) Int. Cl.
*F16B 25/10*        (2006.01)
(52) U.S. Cl. .................................. 411/387.5; 411/387.8
(58) Field of Classification Search ...................... 411/29
See application file for complete search history.

(56) References Cited

U.S. PATENT DOCUMENTS

| | | | | |
|---|---|---|---|---|
| 4,028,987 A | * | 6/1977 | Wilson | 411/387.2 |
| 5,190,425 A | * | 3/1993 | Wieder et al. | 411/29 |
| 6,079,921 A | * | 6/2000 | Gauthier et al. | 411/110 |
| 7,090,452 B2 | * | 8/2006 | Chen | 411/387.1 |
| 7,290,972 B2 | * | 11/2007 | Gauthier | 411/387.1 |

FOREIGN PATENT DOCUMENTS

| | | |
|---|---|---|
| DE | 2801962 | 11/1987 |
| DE | 4203949 | 8/1993 |
| EP | 0049218 | 4/1982 |
| EP | 1445498 | 8/2004 |
| FR | 2238081 | 2/1975 |

* cited by examiner

*Primary Examiner* — Flemming Saether
(74) *Attorney, Agent, or Firm* — Volpe and Koenig, P.C.

(57) ABSTRACT

A self-boring screw (2) having a boring section (6) attached to the free end of the screw shaft (4), two vanes (12) radially protruding from the boring section, the edges of the vanes facing toward the boring tip (8) of the boring section (6) being configured as boring blades (13). The boring section (6) includes a chip discharge zone (14) that is configured such that the edges of the vanes (12) facing toward the boring tip (8) forms a cutting point (S) with a boring radius (16), the cutting point having a distance (A) to the screw shaft (4) that is at least ⅔ of the cutting edge length of the bore tip (8). The chip discharge zone (14) makes it possible that the chips produced by the boring blade (10) at the boring tip (8) can be discharged freely and without buildup. The material cut by the boring blade (10) is conveyed as chipped material away from the boring tip (8) in the direction of the cutting point (S) at a lower vane connection (15) as a result of the rotational motion of the screw (2), thus ensuring unhindered chip discharge. It is possible to compress the chips to be discharged to a maximum of ⅔ of the cross section occurring after the cut. This ensures that even critically sized chips are removed without blocking the discharge of chips from the area of the boring section (6).

7 Claims, 4 Drawing Sheets

SELF-BORING SCREW

BACKGROUND

The present invention relates to a self-boring screw having a boring section arranged at the free end of the screw shaft, comprising one or more vanes or cutters, freely projecting perpendicularly in reference to the axis of the screw at an axial distance from the boring tip, with its and/or their edge facing the boring tip being embodied as a boring blade, with the part of the tip of the screw shaft adjacent to the boring section being embodied as a frustum, and with the boring section comprising a chip discharge zone in the section between the vane or the vanes and the part of the tip embodied as a frustum.

Such self-boring screws are known for various specialized applications. Such a self-boring screw is known from EP 0 049 218 A2, having a boring section arranged at the free end of the screw shaft which is fastened at the screw shaft engaging a slot and comprising drill steel or carbide. At an axial distance from the boring tip, one or two vanes are provided at the boring section, freely projecting perpendicularly in reference to the axis of the screw, with their border facing the boring tip being embodied as a boring blade. The screw shaft tapers in a tip, from which the slot extends into the screw shaft. The tip in turn extends on the two large surfaces of the boring section up to the area of the vanes arranged or formed externally at the areas.

A self-boring screw of the type mentioned at the outset, known from the company flyer having the title "Hard or soft wood on high-strength steel sub-frames—for the direct assembly: high-performance boring screws spedec SCT by SFS Stadler" dated 1987, is used to connect wooden and steel plates. Here, the self-boring screw usually first penetrates the wood. Here, vanes are used connected via a predetermined breaking point to the boring section. Their purpose is to expand the drill diameter during the boring process into a wooden layer, sometimes having a thickness of several centimeters, at least to the diameter of the external thread of the thread provided on the screw shaft. The greater the drill diameter is selected for the expanded hole the less friction develops by the wood chips against the thread. This prevents the thread from heating up and thus damages the surface. If then the boring section drills into the next, metallic layer, the vanes break off at their predetermined breaking point and the boring section creates a drill opening fitted for the thread of the screw shaft. In the next step this thread now forms the thread in the drill opening and the screw is tightened. In order to yield an optimum effect, the vanes are usually mounted to the boring section as closely as possible to the screw shaft and thus close to the beginning of the thread. This way it is achieved that the vanes protect the thread in the best-possible fashion and are not eliminated early. For the discharge of the chips, here usually primarily the chips developing by the vanes themselves are considered. The chips produced by the boring tip itself pass through a narrow chip discharge zone between the part of the tip embodied as a frustum and the vane or vanes into the openings created by the vane or vanes and thus they are removed from the boring blade. In all self-boring screws there is the risk of excessive heating of the boring tip because the chips developing at the boring tip cannot be discharged from the boring section by more than the maximally permissible material compression. This in turn can lead to a failed drilling by said self-boring screws.

SUMMARY

The object of the invention is to design a self-boring screw of the type mentioned at the outset for connections comprising at least one first, softer layer and a second, harder layer such that the chips created by the boring tip can better be transported from the boring section in the direction of the drill opening and thus preventing excessive heating of the boring tip.

This is achieved according to the invention in that the part of the tip of the screw shaft, embodied as a frustum, is arranged above the vane or vanes and that the border of the vane or vanes facing the boring tip forms an intersection (S) with the bore radius, which is equivalent to a distance (A) determined by a minimum width of the chip discharge zone from the part of the tip of the screw shaft embodied as a frustum, which is equivalent to $2/3$ of the length of the cutting blade of the boring tip. This way it is achieved that the chips, if at all, are discharged from the boring section with far less than the maximally permissible material compression. According to the invention, the chips are not directly hindered from discharging and thus the flow of the chips is not slowed down. Even a minor slowing of the speed of discharging chips would lead to a clogging of chips. This would interrupt the discharge of chips and the chips would be compressed. The heat developing here would negatively influence the drill behavior, because the cutting blade, the vane or vanes, and also the thread would be damaged or even deformed by heating. Consequently, the screw connection would fail. Such a failure is not acceptable in functionally or esthetically critical connections. It has been surprisingly shown that the above-mentioned problems can be avoided, which arise due to a compression of chips and a slow-down of the chips discharging, when according to the invention the part of the tip of the screw shaft embodied as a frustum is placed above the vane or vanes and thus creating a free space for a wider chip discharge zone, with its minimum width being in a certain ratio in reference to the length of the cutting edge of the boring tip, namely equivalent to $2/3$ thereof.

Advantageous embodiments of the self-boring screw according to the invention form the objects of the sub-claims.

In one embodiment, where the chip discharge zone is located on the side, and the chips are discharged and on the same plane as the vanes, it is achieved even more securely that the chips originating at the boring tip can be transported unhindered, at least partially via the vane area, towards the outside and/or upwards. If the plane of the vane was positioned above the plane of the chip discharge zone, the chips would be hindered from directly discharging.

In another embodiment, the boring section is made as a platelet comprising flat steel, and the boring section can be reduced to an absolutely minimum volume. The embodiment from flat steel allows that through the material selected the drilling characteristics as well as the torque of the vanes can be adjusted to the application. The boring section can here be made e.g., from high-strength or ultra high-strength material.

In another embodiment, the boring section is punched from flat steel, and the shape of the boring section and the shape of the blade can be produced in a single processing step.

In another embodiment the boring section and the screw shaft are connected to each other in a fixed manner. Due to the drilling stress, enormous forces act upon the screw in the axial and the vertical direction. Secure transfer of force is achieved by the fixed connection of the screw shaft and the boring section. Here, the connection of these two screw parts must be designed such that even peak stress, which may occur for a short period of time or during transportation to the processing site, cannot cause any relative displacement of the two screw parts.

In another embodiment the part of the tip of the screw shaft embodied as a frustum is shaped almost cylindrically a chip discharge zone develops extending radially outward.

In the following, exemplary embodiments of the invention are explained in greater detail with reference to the drawings.

BRIEF DESCRIPTION OF THE DRAWINGS

Shown are.

DETAILED DESCRIPTION OF THE PREFERRED EMBODIMENTS

Figure 5:
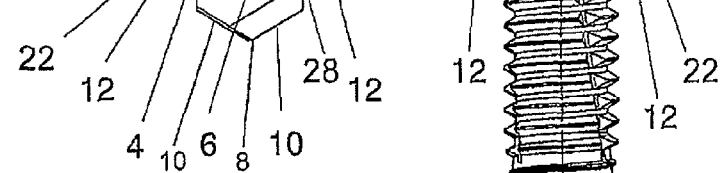
Figure 6:
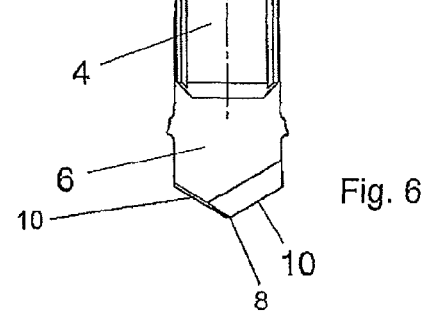
Figure 7:
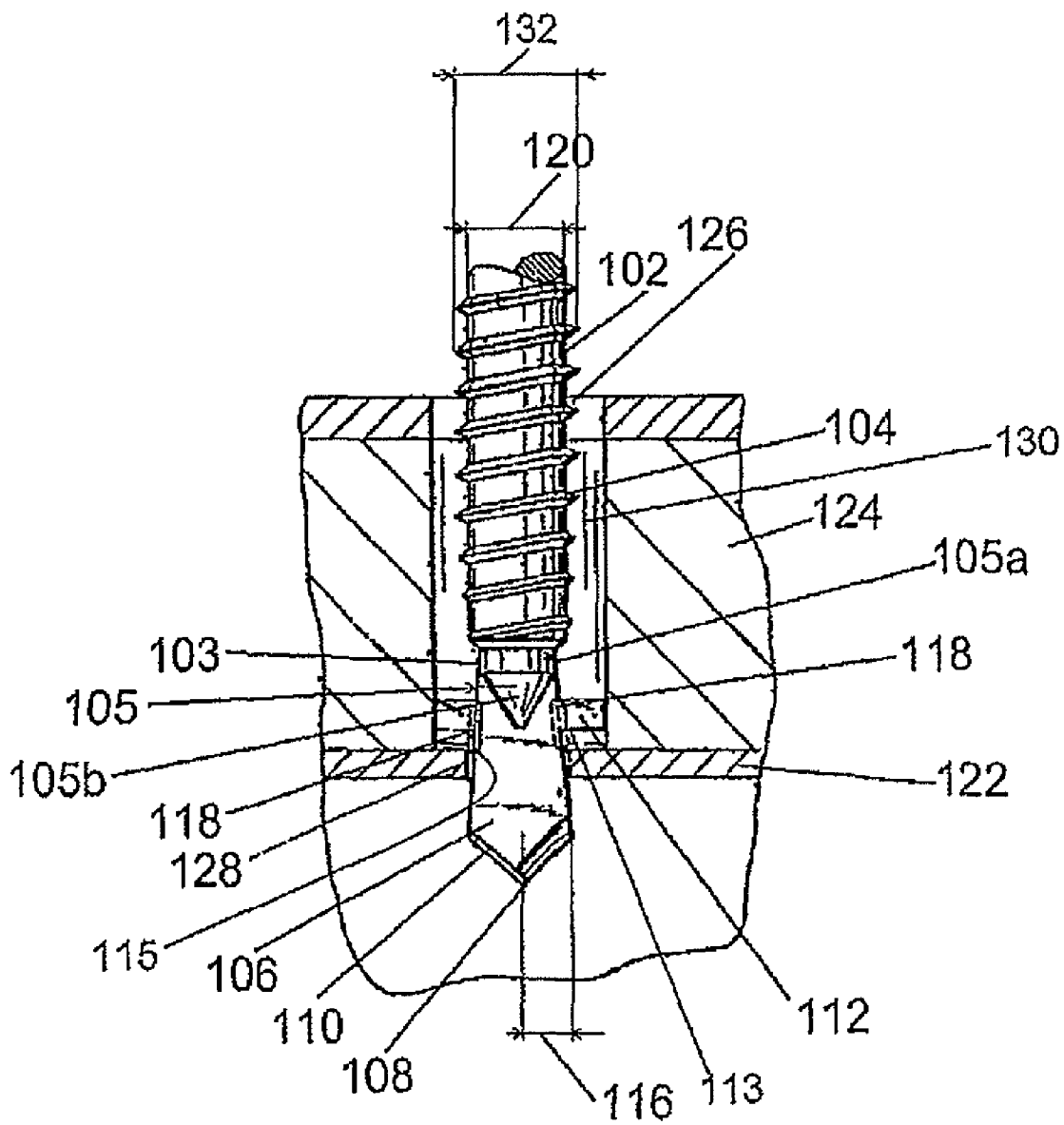

Before explaining in detail the exemplary embodiments of the invention, illustrated in FIGS. 1-6, it is beneficial to briefly discuss prior art, shown in FIG. 7. In FIG. 7 the same reference characters are used as in FIGS. 1-6, however increased by 100 each. A self-boring screw is shown, in its entirety marked 102, having a screw shaft 104 provided with a thread. The screw shaft 104 tapers in a tip 105, comprising a cylindrical part 105a, not provided with a thread, and a frustum-shaped part 105b, not having a thread, either. The thread of the screw shaft 104 is a self-cutting thread. At the free end of the screw shaft 104 a slot is provided (not discernible in FIG. 7), which extends into the tip 105 and is inserted into the boring section 106 embodied plate-shaped. A form-fitting connection develops by an appropriate cross-sectional shape of the inserted end of the boring section 106 and by deformations 103 at the tip 105 of the screw shaft 104 between the boring section 106 and the screw shaft 104. At its free end the boring section 106 comprises a boring tip 108 with an obtuse boring blade 10. The screw shaft 104 and the head of the screw 102 (not visible in FIG. 7) can be made from stainless steel or another metal or from plastic. The plate-shaped boring section 106 is made from drill steel or a hard metal so that even steel of highest resistance can be drilled in a simple fashion. Two opposite vanes 112 follow the boring section 106 at an axial distance from the boring tip 108, freely projecting in opposite directions from each other perpendicularly in reference to the axis of the screw. The borders of the vanes 112 facing the boring tip 108 are embodied as boring blades 113. The drill radius of the boring section 106 is measured at the position of its greatest diameter and is marked 116. The vanes 112 are located in one plane with the boring section 106 embodied in the form of platelets. A predetermined breaking notch 118 is provided, extending approximately parallel in reference to the axis of the screw, at the connection point of the vanes 112 to the boring section 106.

In the above-described exemplary embodiment of prior art, equivalent to EP 0 049 218 A2 already mentioned at the outset, a covering track made from light metal shall be screwed to a steel support 122, with an insulating body being arranged between these two parts or any, in general softer layer 124. The boring tip 108 of the boring section 106 first drills through the cover of the softer layer 124, with then the boring blades 113 of the vanes 112 engaging the cover. The threaded section of the screw shaft 104 can pass therefore a drill opening 126 without contacting the cover. Subsequently the boring section 106 with the boring tip 108 enters a harder layer, i.e. here the steel support 122, with the vanes 112 contacting the steel support 122 after having penetrated the boring section 106. Due to the fact that now the torque applied upon the vanes 112 exceeds the resistance thereof at the boring section 106 the vanes 112 break off at the predetermined breaking notches 118. During further rotation of the screw then the threaded part of the screw shaft 104 enters the drill opening 128 in the steel support 122 such that the final fastening can occur. The core diameter of the thread on the screw shaft 104 is marked 120 in FIG. 7.

In the following, with reference to the illustration in FIGS. 1-6, it is described how the self-boring screw 2 according to the invention differs from the known self-boring screw 102 described with reference to FIG. 7. Here, the structure of the screw 2, if not deviating from the screw 102, is not described anew to avoid repetitions. To this extent, the explanations regarding the screw 102 that were made in reference to FIG. 7 are also applicable to the screw 2 according to FIGS. 1-6. This overview is facilitated in the reference characters, used in the context with the screws 102 and 2, each differ by the number 100.

In the known screw 102, according to the illustration in FIG. 7 the tip 105b of the screw shaft 104 extends on both large areas of the boring section 106, with one of them being discernible in FIG. 7, up to the area of the vanes 112 formed at the exterior of the areas. During the transportation of the chips developing by the boring section 106, this arrangement results in a hindrance of the chip discharge flow through the openings 130 and 126 bored through the vanes. In order to avoid this disadvantage and additional disadvantages connected thereto in the self-boring screw 2 according to the invention, shown in the illustration in FIGS. 1 through 6, the conical part 5b of the tip 5 of the screw shaft 4 is not embodied as a complete cone extending to the area of the vanes 112 but rather as a frustum above the vanes 12. This results in a greater free space above the vanes 12, which in a radial discharge of chips increases the distance of the vanes 12 from the adjacent end of the tip 5 of the screw shaft 4 and thus increases the width of the chip discharge zone 14, which is explained in greater detail in the following.

Figures 1, 2:
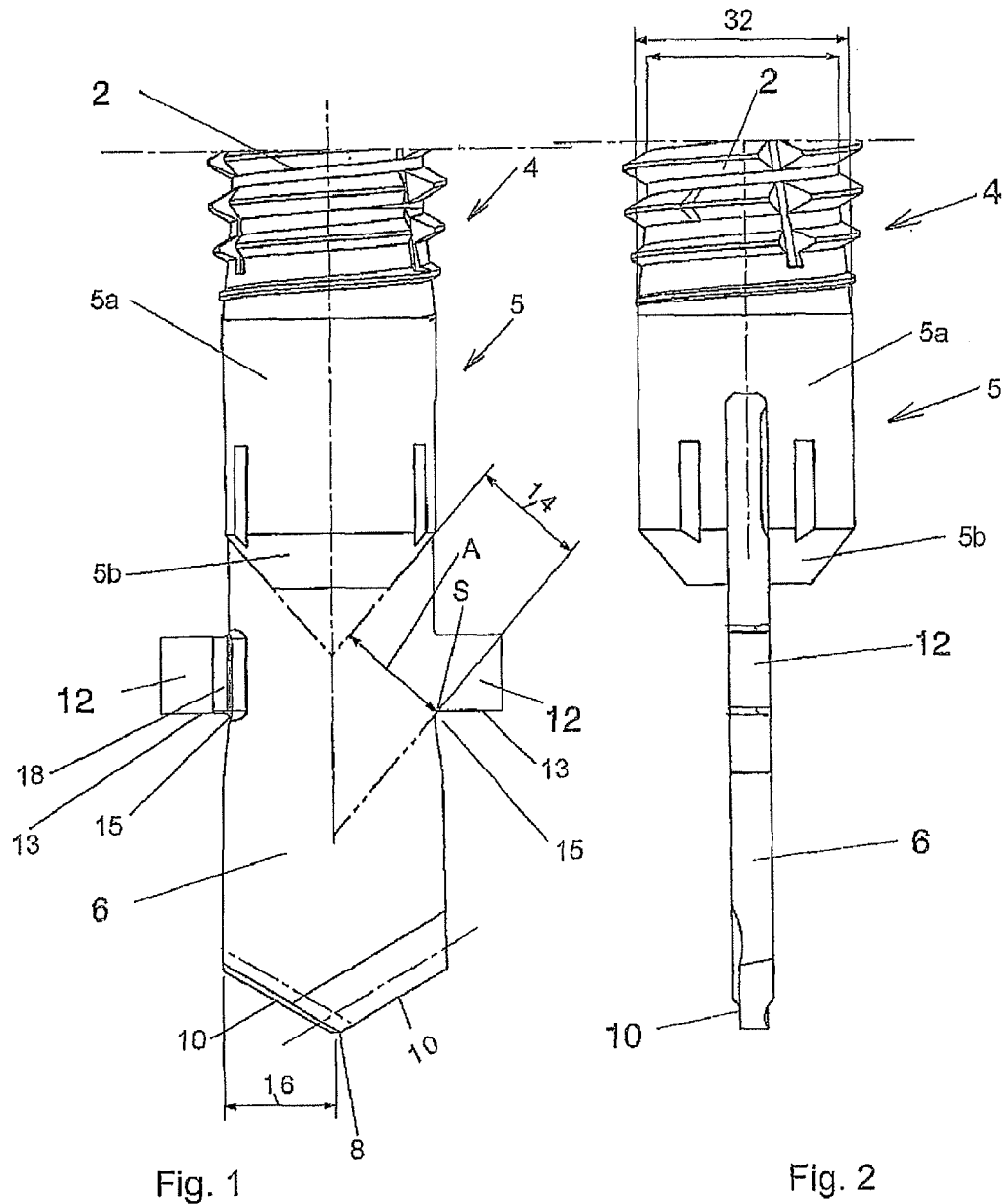
FIG. 1 a self-boring screw according to the invention having a boring section, comprising a chip discharge zone extending diagonally outward, FIG. 2 a side view of the self-boring screw according to FIG. 1, FIG. 3 a self-boring screw according to the invention having a boring section, comprising a chip discharge zone extending radially outward, FIGS. 4-6 views of a drill progression with a self-boring screw according to the invention, and FIG. 7 a self-boring screw according to prior art.

In an embodiment according to FIG. 1, the self-boring screw 2 is shown having a boring section 6, which comprises a chip discharge zone 14 extending diagonally outward. The self-boring screw 2 has a boring section 6 mounted at the free end of the screw shaft 4, which comprises two vanes 12, freely projecting perpendicularly in reference to the screw axis and having an axial distance from the boring tip 8. Their edges facing the boring tip 8 are embodied as a boring blade 13. The chip discharge area 14 of the boring section 6 is formed such that the border of each vane 12 facing the boring tip 8 forms an interface S with the boring radius 16, which has at least a distance A from the screw shaft 4, being equivalent to ⅔ of the length of the cutting blade of the boring tip 8. When, similar to the exemplary embodiment according to FIGS. 1 and 2, the tip 5 of the screw shaft 4 ends in a frustum-shaped part 5b, the distance A between the surface line of the frustum-shaped part 5b and a straight line parallel thereto is determined by the interface S, as shown in FIG. 1. Simultaneously A represents the width of the chip discharge zone 14. The chip discharge zone 14 formed here allows that the chips created by the boring blade 10 can be discharged without interference, i.e. without clogging. The material cut by the boring blade 10 is transported as chips or flakes during the drilling process by way of a rotational motion of the screw 2 away from the boring tip 8 in the direction of the interface 6 at a lower vane connection 15. If now at least a width of ⅔ of the length of the cutting blade 10 is provided at the boring tip 8 for the chip discharge zone 14 between the lower vane connection 15 and the screw shaft 4, even in harder or less suitable materials of the softer layer 24 to be penetrated, e.g. hard wood, an undisturbed discharge of chips can be ensured. Any compression of the chips to be discharged to maximally ⅔ of the cross-section developed after the cutting is possible. This ensures that even critically large chips can be discharged out of the area of the boring section 6 without clogging the chip discharge path.

FIG. 2 shows the self-boring screw 2 according to FIG. 1 in a side view. The advantages of the chip discharge zone 14 in the self-boring screw 2 according to the invention are particularly clearly discernible in the side view. Due to the fact that the chip discharge zone 14 is respectively located on the chip discharge side and in the same plane as the vane 12 the chip can be transported from the boring blade 10, at least beginning at the elevation of the lower vane connection 15, in the axial direction, largely in the same plane, and be moved outwardly by the drill rotation and away from the boring section 6. FIG. 2 also shows a boring section 6 made from flat steel, which offers advantages by a minimum volume of the boring section, particularly for discharging chips away from the boring section. Flat steel is particularly suitable to produce the shape and the boring blades 10 and 13 in a single processing step by way of punching. Any subsequent processing or reprocessing of the boring blades 10 and 13 of the boring tip 8 and/or the tip 12 can largely be omitted.

Figure 3:
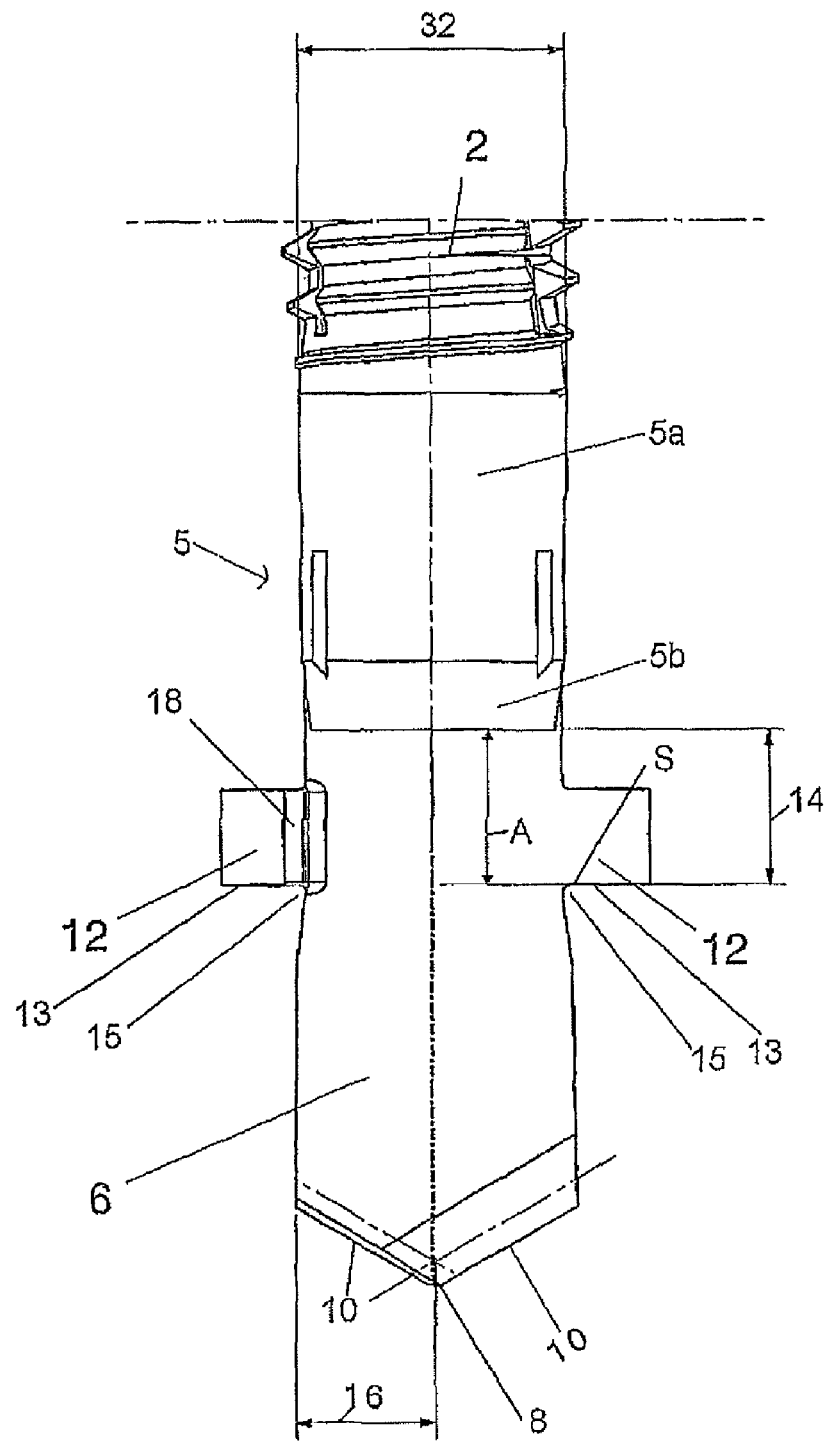

FIG. 3 shows a self-boring screw 2 with a boring section 6 comprising a chip discharge zone 14 extending radially outward. The frustum-shaped part 5*b* is here almost cylindrical. Here, the width of the chip discharge zone 14 or the distance A between the lower vane connection 15 and the screw shaft 4 is defined and at least equivalent to ⅔ of the length of the boring blade of the boring tip 8. Even if the cylindrical screw shaft shows an external shaft diameter 32 being equivalent or only slightly smaller than the drill diameter, it is ensured by the chip discharge zone 14 that any chips developing by the boring blade 10 can be transported unhindered outwardly, laterally between the lower vane connection 15 and the screw shaft 4, and thus be transported away from the boring section 6. When the boring section 6, like shown here, is made from a second element, e.g., a flat steel, it must be ensured that the boring section 6 is fixed to the screw shaft 4. Then it is prevented that the boring tip 8 gets concentrically displaced and no longer reaches its full capacity.

Figure 4:
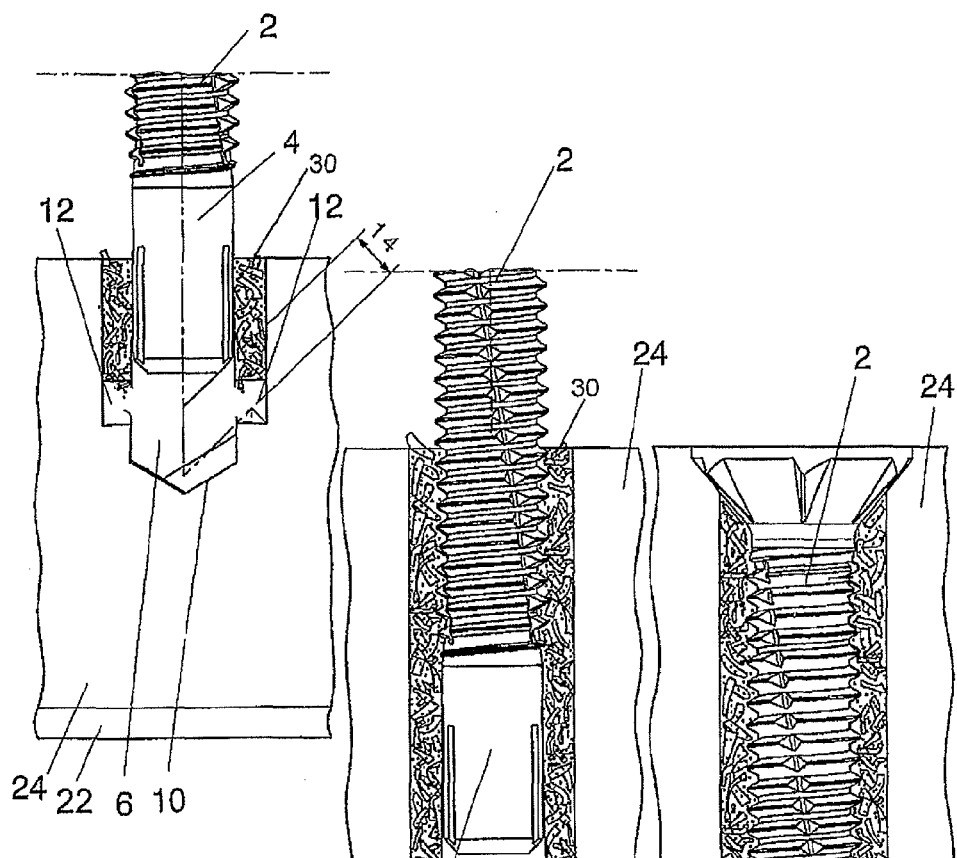

FIGS. 4 through 6 show a drill progression with a self-boring screw 2 according to the invention. Here, FIG. 4 shows the drilling phase in the softer layer 24. The vanes 12 expand the core hole created by the boring blade 10 in the softer layer 24 such that the thread provided at the screw shaft 4 is freely positioned inside the drill opening 30. An additional free space remains between the thread and the core hole. This free space is used to discharge the chips. The chips cut by the boring blade 10 are here transported via the chip discharge zone 14 from the screw shaft 4 outwardly into the above-described free space and thus removed from the boring section 6. Then, in another drilling phase, as shown in FIG. 5, a drill opening 28 is created in the second, harder layer 22. The vanes 12 are ideally mounted such that after the boring tip 8 has fallen through the vanes 12 travel a path of 2 to 3 millimeters to meet the harder layer 22. When the vanes 12 meet the harder layer 22, the vanes 12 are stressed by the penetration shock to such an extent that they break off. Now, as shown in FIG. 6, the thread is formed in the harder layer 22 and the screw 2 is tightened.

LIST OF REFERENCE CHARACTERS

- 2, 102 Self-boring screws
- 3, 103 Deformations
- 4, 104 Screw shaft
- 5, 105 Tip
- 5*a*, 105*a* Cylindrical part
- 5*b*, 105*b* Conical or frustum-shaped part
- 6, 106 Boring section
- 8, 108 Boring tip
- 10, 110 Boring blade
- 12, 112 Vane
- 13, 113 Boring blade
- 14 Chip discharge zone
- 15, 115 Vane connection
- 16, 116 Drill radius
- 18, 118 Predetermined breaking notch
- 20, 120 Core diameter
- 22, 122 Harder layer (steel support)
- 24, 124 Softer layer (wood)
- 26, 126 Drill opening
- 28, 128 Drill opening
- 30, 130 Drill opening
- 32, 132 External shaft diameter
- A Distance
- S Intersection

The invention claimed is:

1. A self-boring screw comprising a screw shaft and a boring section provided at a free end of the screw shaft, the boring section including a boring tip and boring blades set at an obtuse angle to each other defining a drill radius adapted to form a hole for engagement with a thread on the screw shaft, one or more vanes set at an axial distance from the boring tip that project perpendicularly in reference to an axis of the shaft, with a border of the one or more vanes facing the boring tip each being embodied as a vane boring blade that is adapted to form a clearance hole for the thread on the screw shaft so that a clearance space is provided between an outside of the thread and the inside of the clearance hole, a part of a tip of the screw shaft adjacent to the boring section is embodied as a frustum, and with the boring section comprising a chip discharge zone in an area between the vane or the vanes and the part of the tip embodied as the frustum, the part (5*b*) of the tip (5) of the screw shaft (4) embodied as the frustum being arranged above the vane or the vanes (12) and edges of the vane or the vanes (12) facing the boring tip (8) form an intersection (S) with the drill radius (16) that is an axial distance (A) from a bottom of the part (5*b*) of the tip (5) of the screw shaft (4) embodied as the frustum that defines a minimum width of a chip discharge zone (14) which is equivalent to ⅔ of a length of a cutting edge of one of the boring blades.

2. A self-boring screw according to claim 1, wherein the chip discharge zone (14) is located on the chip discharge side and in a same plane as the vane or vanes (12), respectively.

3. A self-boring screw according to claim 2, wherein the boring section (6) and the screw shaft (4) are connected to each other in a fixed manner.

4. A self-boring screw according to claim 1, wherein the boring section (6) is made as a platelet comprising flat steel.

5. A self-boring screw according to claim 4, wherein the boring section (6) is punched from flat steel.

6. A self-boring screw according to claim 1, wherein the boring section (6) is made from a high-strength material.

7. A self-boring screw according to claim 1, wherein a part of the screw shaft above the part (5*b*) of the tip (5) of the screw shaft (4) embodied as the frustum is embodied generally cylindrically.

* * * * *